United States Patent
Lucienne et al.

(10) Patent No.: US 7,406,824 B2
(45) Date of Patent: Aug. 5, 2008

(54) HYDROSTATIC TRANSMISSION CIRCUIT WITH REPLENISHING FOR A VEHICLE

(75) Inventors: Philippe Lucienne, Aumont (FR); Terence Herbert Collins, Peterborough (GB); André Prigent, Saintines (FR)

(73) Assignee: Poclain Hydraulics Industrie, Verberie (FR)

( * ) Notice: Subject to any disclaimer, the term of this patent is extended or adjusted under 35 U.S.C. 154(b) by 157 days.

(21) Appl. No.: 10/577,026

(22) PCT Filed: Oct. 28, 2004

(86) PCT No.: PCT/FR2004/002772

§ 371 (c)(1), (2), (4) Date: Apr. 25, 2006

(87) PCT Pub. No.: WO2005/043009

PCT Pub. Date: May 12, 2005

(65) Prior Publication Data

US 2007/0079610 A1    Apr. 12, 2007

(30) Foreign Application Priority Data

Oct. 28, 2003 (FR) .................................. 03 12620

(51) Int. Cl.
*F16D 31/02* (2006.01)
*B60K 17/14* (2006.01)

(52) U.S. Cl. ........................................ 60/464; 180/308
(58) Field of Classification Search ............... 60/464, 60/468; 180/242, 308
See application file for complete search history.

(56) References Cited

U.S. PATENT DOCUMENTS

| | | | | |
|---|---|---|---|---|
| 6,354,392 | B1 * | 3/2002 | Cousin et al. | 180/308 |
| 6,991,058 | B2 * | 1/2006 | Cousin et al. | 180/242 |
| 7,231,764 | B2 * | 6/2007 | Mangano et al. | 60/464 |

FOREIGN PATENT DOCUMENTS

| | | |
|---|---|---|
| DE | 19838651 | 3/2000 |
| EP | 0547947 | 6/1993 |
| EP | 0816153 | 1/1998 |
| EP | 1010566 | 6/2000 |
| EP | 1026024 | 8/2000 |
| EP | 1026025 | 8/2000 |
| WO | WO 03013896 | 2/2003 |

* cited by examiner

*Primary Examiner*—Michael Leslie
(74) *Attorney, Agent, or Firm*—Ladas & Parry LLP

(57) ABSTRACT

The circuit comprises a main hydraulic pump (52), two main ducts (50, 54), a booster pump (56), a hydraulic motor (10; 20) which comprises two elementary motors (11, 12; 21, 22) for driving a first displacement member (1, 2), and a second hydraulic motor (30; 40) for driving a second displacement member (3, 4). The second elementary motor (12) is in parallel with the second main motor (30) while the first elementary motor (11) and the second main motor (20) are connected to a feed or discharge additional duct, e.g. via a series link between them. The booster pump (56) is connected to the additional duct, e.g. an interconnection duct (60; 62) for interconnecting the first elementary motor (11; 21) and the second main motor (30; 40). A replenishing valve (70) is suitable for connecting one of the main ducts to a pressure-free reservoir (51) and the circuit further comprises means (72) for preventing said replenishing link from being established on detecting a condition that reveals a spin situation.

27 Claims, 5 Drawing Sheets

HYDROSTATIC TRANSMISSION CIRCUIT WITH REPLENISHING FOR A VEHICLE

Figure 1:
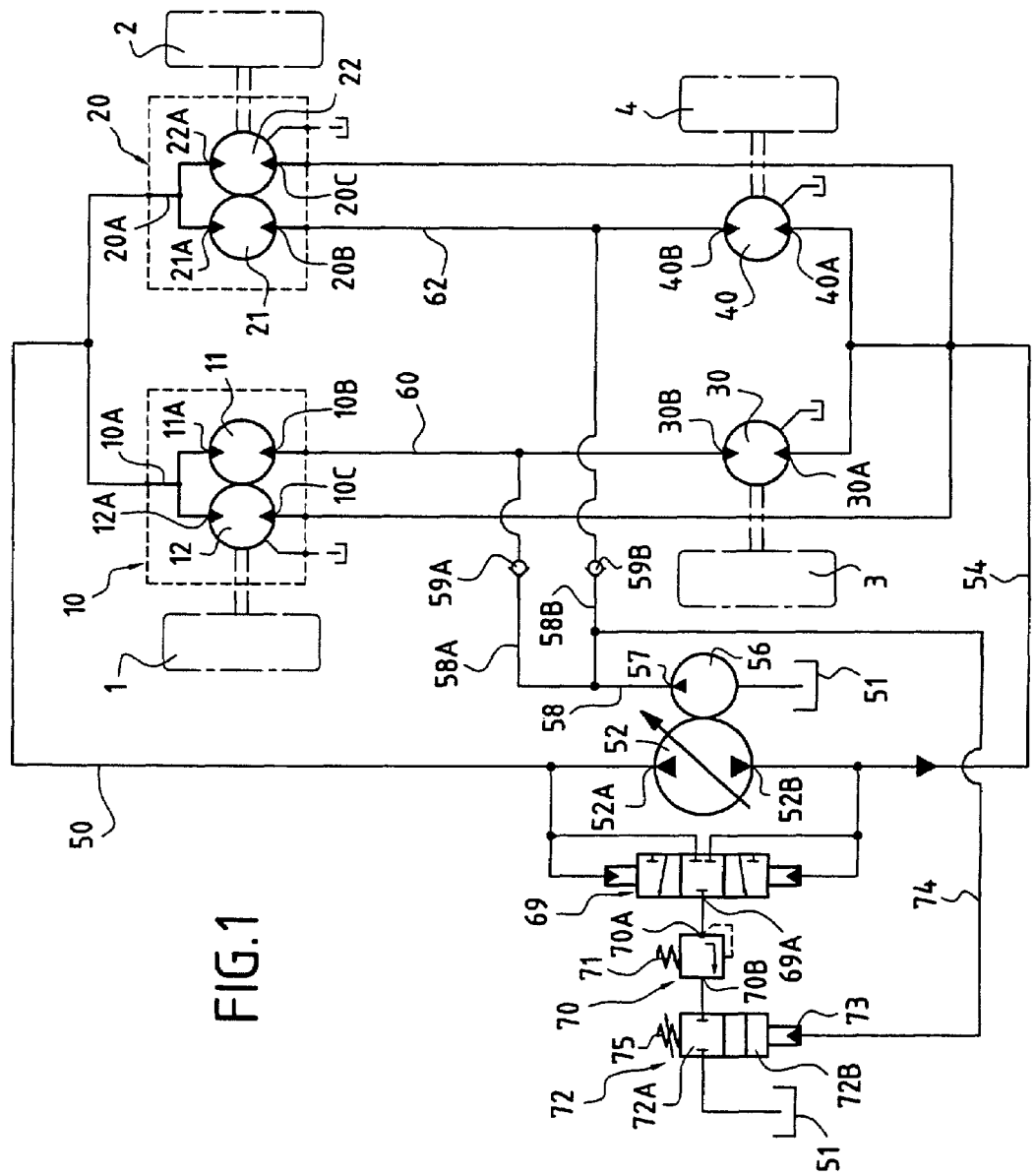

The present invention relates to a hydrostatic transmission circuit for a vehicle having at least one first displacement member and at least one second displacement member disposed one after the other in the direction of travel of said vehicle, the circuit comprising at least one main hydraulic pump, two main ducts which are respectively a feed main duct and a discharge main duct, and a first hydrostatic motor and a second hydraulic motor for driving respective ones of said first and of said second displacement members.

At least the first hydraulic motor is a dual motor made up of two elementary motors, each elementary motor having a feed or discharge first elementary connection and a discharge or feed second elementary connection, the first elementary connections being united to form a common first main connection for the first hydraulic motor, while the second elementary connections are mutually separate and form respective ones of the second and third main connections of the first hydraulic motor.

The first main connection of the first hydraulic motor is connected to the first main duct while the third main connection of said first motor is connected to the second main duct, the second hydraulic motor having a first main connection which is also connected to the second main duct and a second main connection which is connected to a feed or discharge additional main duct as is the second main connection of the first hydraulic motor.

The circuit further comprises booster means for boosting the feed or discharge ducts and at least one replenishing valve suitable for being connected to one of the main ducts and suitable for taking up an open configuration in which it enables a replenishing link to be established between the main duct to which it is connected and a pressure-free reservoir, and a closed configuration in which it prevents said link from being established.

A circuit of this type is known from Patent Applications EP 0 547 947, EP 1 026 024, EP 1 026 025, EP 1 010 566, and WO 03/013896 in the name of the Applicant. Patent Application EP 0 816 153 also discloses a circuit of this type, in which the second main connections are interconnected by an interconnection duct, so that there is a single feed or discharge additional duct which is formed by that interconnection duct.

Depending on circumstances, the first displacement member (the one that is driven by the dual motor) is a front displacement member of the vehicle, or, conversely, it is a rear displacement member. As indicated in the above-mentioned patent applications, the configuration of the circuit means that the first elementary motor of the first hydraulic motor and the hydraulic motor are disposed in series with the fluid feed and with the fluid discharge by means of the presence of the interconnection duct, while the second elementary motor of the first hydraulic motor and the second hydraulic motor are disposed in parallel.

In a manner known per se, a circuit of this type can include a replenishing system comprising a replenishing valve of the above-mentioned type. Since the circuit is, in particular, a closed circuit, replenishing makes it possible to tap fluid from one of the main ducts, for example, for bringing it back to the reservoir while cooling it, before re-injecting it into the circuit via the booster pump. Replenishing also makes it possible to flush the casing(s) of the hydraulic motor(s).

The advantages of such a circuit are indicated in the above-mentioned patent applications, and are related to the fact that the series interconnection makes it possible to synchronize the displacement members, while the parallel interconnection makes it possible to obtain outlet torques that are equal.

As indicated, for example, in WO 03/013896, said advantages are, for example, beneficial for controlling situations in which a displacement member loses its grip.

For example, it is considered that the first hydraulic motor drives a front wheel of the vehicle, that the second hydraulic motor is fed first by the pump and that the third main connection of the first hydraulic motor, i.e. the second elementary connection of its second elementary motor, is also fed by the pump. In this example, the feed orifice of the first elementary motor is its second elementary connection, which is also the second main connection of the first hydraulic motor, while the discharge orifice of the first elementary motor is its first elementary connection and the first main connection of the first hydraulic motor.

If the front wheel loses its grip and sees its speed increase under the effect of the spin, the two elementary motors of the first hydraulic motor draw a large quantity of fluid.

For the first elementary motor, which is the motor that is fed via the interconnection duct, the fluid drawn in is the fluid that is delivered into said duct by the second hydraulic motor. However, since the rear wheel is not spinning, the discharge flow-rate of said second hydraulic motor is not sufficient to satisfy the demand for fluid drawn in. Therefore the pressure tends to decrease in the interconnection duct and the fluid coming from the booster pump is drawn into the interconnection duct by the first elementary motor (the booster means can comprise a boost duct fed by a booster pump and in particular connected to the interconnection duct; they can also use a fluid pressure coming from an auxiliary circuit). However, if the replenishing valve is in its open configuration, the additional fluid coming from the booster pump does not lead to an increase in pressure in the delivery main duct, to which the first main connection of the first hydraulic motor is connected. This surplus fluid is removed via the replenishing valve towards the reservoir.

As a result, in spite of the quantity of fluid drawn in by the first hydraulic motor and reaching the feed orifice of the first elementary motor by means of the booster pump, the pressure increases little or not at all at the delivery orifice of the first elementary motor, so that the torque from said first motor does not decrease, thereby preventing the wheel that is spinning from being hydrostatically braked subsequently.

In another possible configuration, e.g. of the type described in Patent Application DE 198 38 651, the circuit further comprises a main pump whose orifices are connected respectively to the second main connection of the first motor and to the second main connection of the second motor. In which case, the circuit thus has two "feed or discharge additional ducts" which are connected respectively to the inlet and to the outlet of said second pump.

The second elementary motor of the first main motor and the second main motor are disposed in parallel because of them being linked to the second main duct. Since the second main orifices of the second motor are connected to respective ones of the two pumps, said pumps are arranged so that, under normal operating conditions, they deliver and suck in the same flow rate of fluid, the cubic capacities of the pumps and of the motors being determined accordingly.

The above-mentioned difficulties encountered when one of the wheels spins thus exist in the same manner in this other configuration.

An object of the present invention is to improve this situation by remedying the above-mentioned drawbacks suffered when a wheel loses its grip.

This object is achieved by means of the fact that the circuit of the invention further comprises means for preventing the replenishing link from being established on detecting a condition that reveals a spin situation.

This condition may be the fact that the pressure in the boost duct becomes lower than a determined threshold pressure.

The fact that the pressure in the boost duct becomes lower than said threshold pressure means that a large fluid flow rate is drawn into the circuit and that the flow rate delivered by the booster pump is not sufficient to satisfy this demand while maintaining, in the ducts connected to the motors, a pressure at least equal to the threshold pressure. In other words, this means that one of the displacement members is rotating at a speed that excessive relative to the speed of the other one, i.e. it is spinning.

In this situation, replenishing is prevented, so that the fluid drawn in, coming from the booster pump, finds itself in the main delivery duct without being removed therefrom. As a result, unlike in the above-mentioned situation, the first elementary motor can deliver torque making it possible for satisfactory hydrostatic braking to be achieved.

Advantageously, the threshold pressure is lower than the desired boost pressure. For example, for a desired boost pressure of 27 bars, the threshold pressure chosen may be about 15 bars to 18 bars.

The condition that reveals a spin situation may also be the fact that the speed of a displacement member, as measured by a speed sensor associated with said member, becomes higher than a determined limit speed, or the fact that the difference between the speeds of the displacement members, as measured by sensors, becomes higher than a limit difference.

Such a condition may also be the fact that the flow rate in a main duct increases excessively or indeed that the pressure increases excessively in the discharge duct (the phenomenon the causes such an increase is explained below).

Advantageously, the circuit further comprises a replenish enable/disable valve caused to go between an open position in which it opens the replenishing link and a closed position in which it closes said link, the replenish enable/disable valve being caused to move between its open and closed positions as a function of a parameter expressing said condition that reveals a spin situation.

Said replenish enable/disable valve may be a solenoid valve, receiving a closure control signal when a condition that reveals a spin situation is detected. Such a solenoid valve is particularly suitable when said condition is expressed by the fact that the speed of a displacement member or a difference in speed between displacement members exceeds a limit value.

The replenish enable/disable valve may also be a hydraulic valve, driven by the pressure in the boost duct against a return force to go between a replenish enable position in which it enables the replenishing link to be established, and a replenish disable position in which it prevents said link from being established.

The replenish enable/disable valve is then driven directly by the pressure in the boost duct. The above-mentioned return force is rated at the threshold pressure. Thus, so long as the pressure in the boost duct remains higher or equal to the threshold pressure, it predominates over the return force so as to maintain the replenish enable/disable valve in its replenish enable position in which it enables the replenishing link to be established. Conversely, when the pressure in the boost duct becomes lower than said threshold pressure, it is the return force which predominates, which results in the replenish enable/disable valve being put into its replenish disable position.

In a first variant, the replenish enable/disable valve is disposed between the replenishing valve and the reservoir.

The replenishing may be performed via a conventional valve, advantageously comprising a replenishing selector and a pressure limiter. It is at the outlet of the replenishing valve constituted, for example, by the above-mentioned limiter, that the replenish enable/disable valve is situated. In the above-mentioned example, the rated pressure of the pressure limiter may be about 22 bars.

In a second variant, in which the replenishing valve has a moving member mounted to move between a first position and second position, which positions correspond respectively to the open configuration and to the closed configuration of the replenishing valve, said replenishing valve has an opening control chamber suitable for being connected to one of the main ducts for urging the moving member towards its first position and a closure control chamber suitable for being fed with fluid so as to urge the moving member towards its second position, and in that said circuit further comprises a control valve suitable, as a function of the pressure in the boost duct, for connecting said closure control chamber to the pressure-free reservoir or for isolating said chamber from said reservoir.

In which case, the replenishing valve, e.g. a pressure limiter, is driven by the control valve, as a function of the pressure in the boost duct.

Advantageously, the replenish enable/disable valve is the above-mentioned control valve.

Advantageously, the closure control chamber is suitable for being fed with fluid by being connected to one of the main ducts.

Advantageously, the opening and closure control chambers are suitable for being connected to the same main duct, a constriction being disposed between said main duct and the closure control chamber.

Advantageously, the circuit further comprises means for enabling the replenishing link to be established again when the pressure in the discharge main duct becomes higher than a determined limit pressure.

These means may be a suitable shape and suitable control for the replenishing valve or for the replenish enable/disable valve mentioned above.

Figure 3:
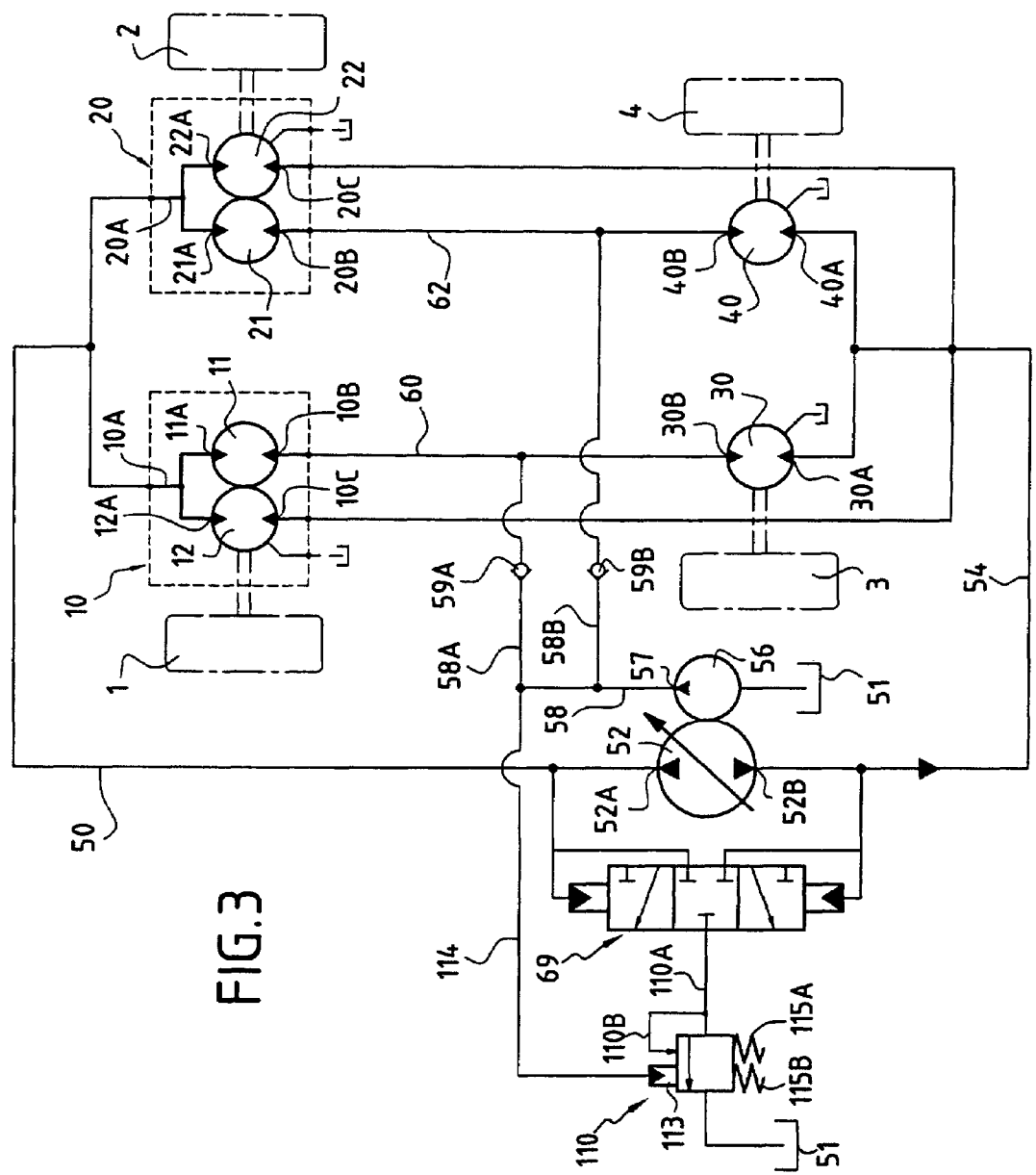
Figure 4:
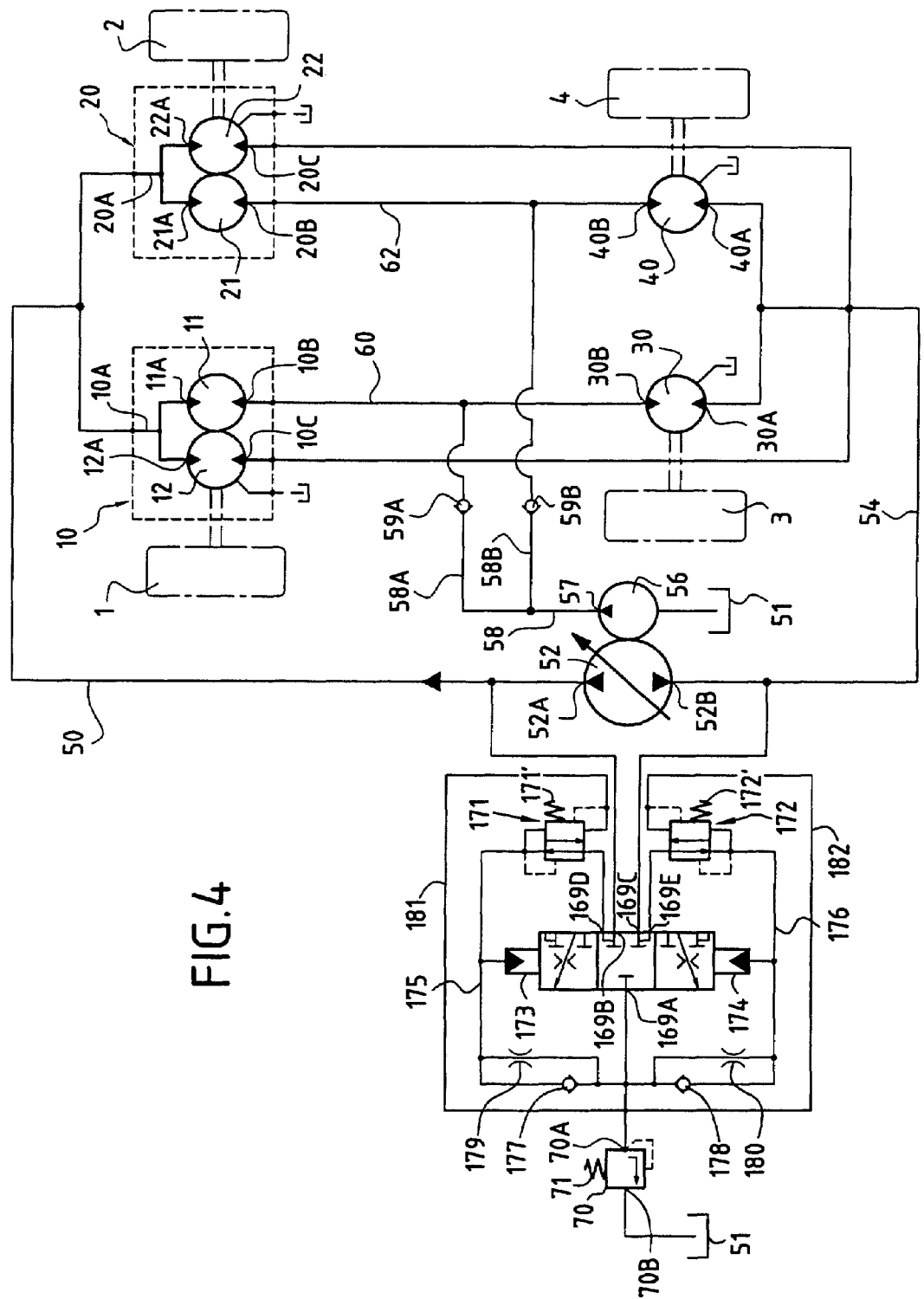
Figure 5:
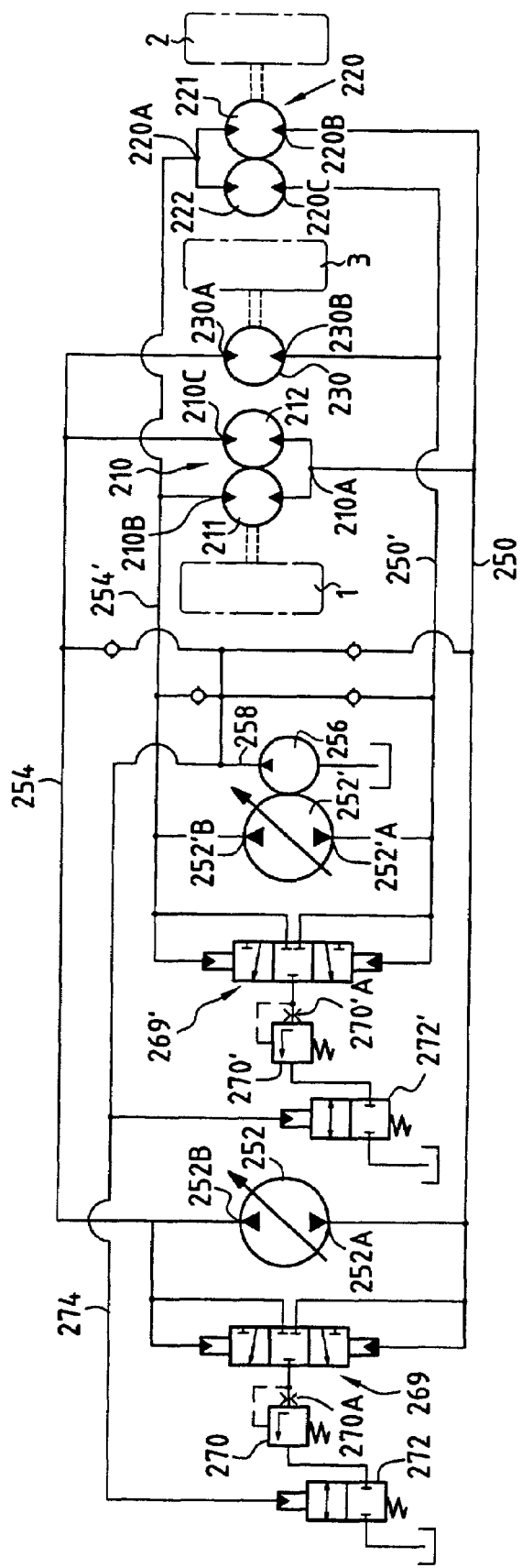

The invention will be well understood and its advantages will appear more clearly on reading the following detailed description of embodiments shown by way of non-limiting example. The description refers to the accompanying drawings, in which:

FIGS. 1 to 4 show respective ones of four embodiments of a circuit illustrating the circuit of the invention, for a four-wheel-drive vehicle; and FIG. 5 shows the use of the first embodiment of the invention for a different circuit.

The vehicle is provided with two groups of two wheels 1 & 2 and 3 & 4. For example the wheels 1 & 2 are front wheels that are coupled to respective ones of front main motors 10 & 20, while the wheels 3 & 4 are rear wheels that are coupled to respective ones of rear motors 30 & 40.

In the example shown, the front motors 10 and 20 are dual motors each of which comprises two elementary motors, respectively 11 & 12 and 21 & 22.

The first elementary connections 11A & 12A of the motors 11 and 12 are united to form a common first main connection 10A for the motor 10. Conversely, the second elementary connections of the elementary motors 11 and 12 are separate and they form respective ones of the second and third main connections 10B & 10C of the motor 10. Similarly, the first elementary connections 21A and 22A of the motors 21 and 22 form a first main connection 20A of the motor 20, while the second elementary connections form respective ones of second and third main connections 20B and 20C of the motor 20.

It can be observed that both of the first main connections 10A and 20A of the motors 10 and 20 are connected to a first main duct 50 of the circuit, which duct is itself connected to a first orifice 52A of the main hydraulic pump 52. The third main connections 10C and 20C of the motors 10 and 20 are connected to the second main duct 54 which is connected to the other orifice 52B of the pump 52, the circuit being closed.

The second main connections 10B and 20B of the motors 10 and 20 are connected to respective ones of the second main connections 30B and 40B of the motors 30 and 40, respectively via an interconnection duct 60 and via an interconnection duct 62.

The first main connections 30A and 40A of the motors 30 and 40 are connected to the second main duct 54.

Thus, if the main duct 54 serves as the fluid feed, and if each side of the vehicle is considered separately, it is observed that, for the left side, the rear motor 30 and the front second elementary motor 12 are fed in parallel, while the rear motor 30 and the front first elementary motor 11 are fed in series, via the interconnection duct 60. If the right side is considered, it is observed that the motor 40 and the second elementary motor 22 are fed in parallel, while the first elementary motor 21 is fed in series, after the motor 40, via the interconnection duct 62.

The circuit further includes a booster pump 56 which is connected to the interconnection ducts 60 and 62 via a boost duct 58. More precisely, the delivery orifice 57 of the booster pump 56 is connected to the interconnection ducts 60 and 62 respectively via a boost segment 58A and via a boost segment 58B.

In a manner known per se, check valves, respectively 59A & 59B, are disposed on the boost segments 58A & 58B, so as to make it possible for fluid to flow between the booster pump and the interconnection ducts 60 and 62 only in the direction going from the booster pump towards said interconnection ducts.

In a manner known per se, the booster pump 56 serves to maintain sufficient pressure in the circuit to avoid cavitation phenomena and thus to protect the various components of the circuit. For this purpose, as is known, check valves are disposed on boost ducts (not shown) that are connected to the main ducts 50, 54.

In a manner known per se, but not shown, the circuit can also include devices such as pressure limiters for protecting the various components of the circuit from any pressure increases that might occur. Control valves, e.g. of the type described in the patent applications mentioned in the introduction to the present patent application, can also be provided.

In order to perform the replenishing, the circuit further includes a replenishing valve 70 which is suitable for being connected one of the main ducts in order to tap fluid from said duct.

In the advantageous examples shown, the circuit includes a replenishing selector 69 that is known per se, and that is connected to the two main ducts 50 and 54 so as to put that one of said two ducts which is at the lower pressure (i.e. normally the discharge duct) into communication with the replenishing valve 70. Thus, the outlet 69A of the replenishing selector 69 communicates with the inlet 70A of the replenishing valve.

The various component elements of the circuit of the invention that are described above with reference to FIG. 1 are also to be found in the embodiment shown in FIG. 2, except that, in FIG. 2, the replenishing valve is slightly different, as explained below.

Returning to FIG. 1, it can be observed that the first embodiment of the circuit includes a replenish enable/disable valve 72 which is controlled by the pressure in the boost duct. In this example, this valve 72 is a two-position selector whose hydraulic control chamber 73 is connected to the boost duct via a control duct 74. It should be noted that the pressure in the duct 74 is the same as the pressure that prevails in the duct 58 and in the segments 58A and 58B, upstream from the check valves 59A and 59B.

In FIG. 1, the valve 72 is shown in its replenish disable position 72A, in which it prevents the outlet 70B of the replenishing valve 70 from being connected to the pressure-free reservoir 51.

The term "pressure-free reservoir" should be understood to mean a reservoir at atmospheric pressure or at a pressure very slightly above atmospheric pressure, while remaining lower than the boost pressure desired for the circuit.

The replenish enable/disable valve 72 is urged into this replenish disable position by a return spring 75, whose effect opposes the effect of an increase in pressure in the chamber 73. When the pressure in said chamber 73 increases to in excess of the pressure rating of the spring 75, the valve 72 can take up its second position 72B in which it establishes a link between the outlet 70B of the replenishing valve 70 and the reservoir 51.

As indicated above, the pressure rating of the spring 75 is advantageously lower than the boost pressure desired in the circuit.

The replenishing valve 70 is a pressure limiter which, in a manner known per se, is controlled by the pressure at its inlet 70A (which feeds an opening control chamber that is not shown), so as to open when said pressure is sufficient, against the opposing return force of a spring 71.

By means of the valve 72, the boost pressure is taken into account for enabling or disabling replenishing but, insofar as the inlet 70A of the valve is connected to the main duct 50 or 54 that is at the lower pressure, replenishing is controlled conventionally as a function of the pressure in the main duct from which the replenishing fluid is tapped when the valve 72 is in its replenish enable position.

Figure 2:
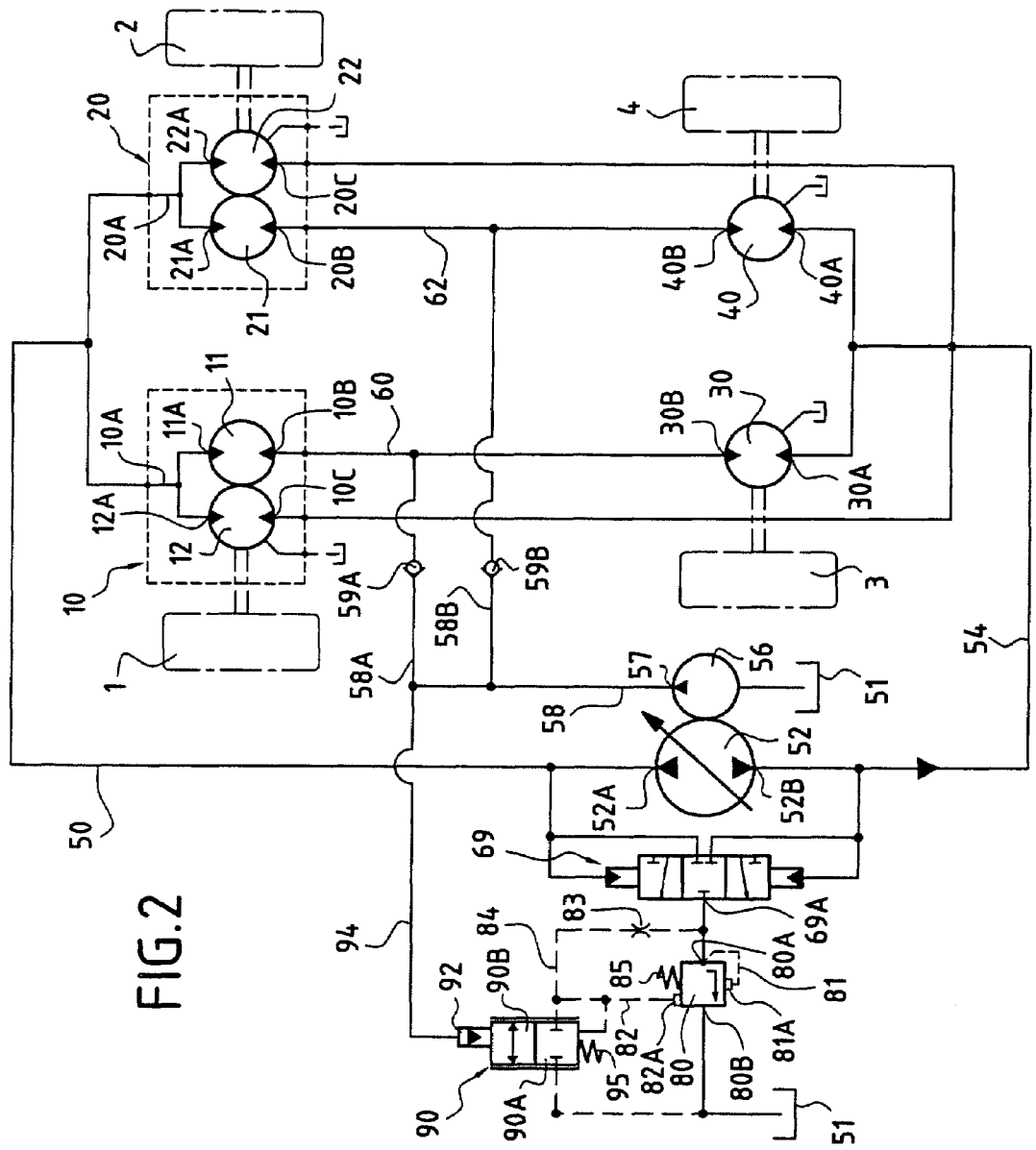

FIG. 2 is described below, with reference only to the differences between the embodiment it shows and the embodiment shown in FIG. 1.

In FIG. 2, the replenishing valve 80, which is situated downstream from the replenishing selector 69, includes not only an opening control chamber but also a closure control chamber. For reasons of clarity of the following explanation, the opening control chamber and the closure control chamber are shown diagrammatically in FIG. 2, in which they are respectively designated by references 81A and 82A. The inlet 80A of the replenishing valve 80 is connected to the outlet 69A of the replenishing selector 69. Its outlet 80B is connected to the pressure-free reservoir 51.

The replenishing valve 80 is shown diagrammatically, but the arrow drawn in the valve indicates that it includes a moving member mounted to move between two positions that correspond respectively to its open configuration and to its closed configuration. The duct segment 81 represents the fluid feed to the opening control chamber 81A, while the duct segment 82 represents the fluid feed to the closure control chamber 82A.

Thus, in the example shown, the opening control chamber 81A is connected to the main duct to which the inlet 80A of the replenishing valve 80 is connected. In this example, the closure control chamber 82A is also suitable for being fed with fluid by being connected to one of the main ducts (in this case, the same duct as the duct to which the opening control chamber is connected. Both the opening control chamber 81A and the closure control chamber 82A are connected to the outlet 69A of the selector 69, and a constriction 83 is disposed on the link segment 84 between the outlet 69A and the duct segment 82, so that said constriction is disposed between the closure control chamber 82A and the main duct to which the opening control chamber and the closure control chamber are connected.

The closure control chamber 82A is associated with replenishing resilient return means 85 continuously urging the moving member of the replenishing valve 80 towards its second position corresponding to the closed configuration of said valve. For example, said resilient return means are constituted by a spring, rated to enable the replenishing valve to open whenever the pressure difference between the opening control chamber 81A and the closure control chamber 82A reaches a determined value.

In FIG. 2, the circuit includes a control valve 90 which is also a replenish enable/disable valve in the sense defined above, because it is controlled by the pressure in the boost duct against a return force.

More precisely, the control valve 90 has a hydraulic control chamber 92 which is connected to the boost duct 58, 58A, 58B via a control duct 94. The pressure in the duct 94 is the same as the pressure prevailing in the duct 58 and in the duct segments 58A and 58B upstream from the check valves 59A and 59B.

In FIG. 2, the control valve 90 is shown in its replenish disable position 90A, into which it is urged by the return force exerted by the spring 95. When the valve 90 is in this position 90A, the closure control chamber 82A of the replenishing valve 80 is isolated from the reservoir 51. As a result, the pressure in said chamber can become sufficient, combined with the return force exerted by the spring 85, to keep the valve 80 in its closed position, despite the forces exerted by the fluid pressure in the opening control chamber 81A.

When the pressure in the boost segment 58, and thus in the control duct 94, becomes sufficient, the valve 90 can be moved into its replenish enable position 90B, in which it connects the duct 82 to the reservoir 51. When the valve 90 is in this position, the closure control chamber 82A of the replenishing valve 80 can be connected to the pressure prevailing in said reservoir. The pressure in the opening control chamber 81A can then become predominant over the forces exerted by the pressure in the closure control chamber 82A and by the spring 85, so that the valve 80 can take up its open configuration.

It is noted that, when the closure control chamber 82A is connected to the reservoir 51, the valve 80 behaves like a pressure limiter, by being controlled by the pressure at its inlet, which pressure is itself the pressure prevailing in the main duct to which said valve 80 is connected. When replenishing is enabled by the valve 90, said replenishing is thus performed normally.

It is noted that the control valve 90 is a progressive valve, which makes it possible to vary the flow rate of fluid between the closure control chamber 82A and the reservoir 51.

In the examples shown, the vehicle has two front displacement members, each driven by a respective dual motor, and two rear displacement members, each of which is driven by a single motor. Naturally, the circuit of the invention also applies to a vehicle having a first set of wheels or a roller driven by a dual motor, and a second set of wheels or a roller driven by another motor, which can have one or more cubic capacities and be a single or a dual motor. In general, the vehicle has at least one first displacement member driven by the first motor which is a dual motor, and at least one second displacement member driven by a second motor. It also applies to any type of vehicle whose circuits are described in the patent applications mentioned in the introduction.

A description is given below of FIG. 3, in which the elements unchanged relative to FIGS. 1 and 2 are designated by like references.

The circuit of FIG. 3 includes means for enabling replenishing to take place again when the pressure in the discharge main duct becomes greater than a determined limit pressure.

In this circuit, as in the circuits of FIGS. 1 and 2, the half-motors 11 and 21 are connected in series with respective ones of the motors 30 and 40 via the interconnection ducts 60 and 62. As a result, when one of the wheels coupled to a dual motor spins, e.g. the wheel 2, the very high rate of revolution of the "series" motor of said wheel (e.g. the half-motor 21) causes the motor to operate like a pump, which causes a rush of fluid to its discharge orifice (e.g. 21A) and thus a major increase in the pressure in the discharge duct (e.g. 50).

As indicated above, such an increase in pressure in the delivery duct can be the condition that reveals spin and that is chosen for causing the replenishing link to close.

However, in the embodiment shown in FIGS. 1 and 2, if the spin is not rapidly brought under control after the replenishing link is closed, the pressure continues to increase in the discharge duct which is no longer connected to the reservoir via the replenishing valve.

If it were to become excessive, this pressure increase could damage certain components of the circuit. This risk is avoided in the embodiment of FIG. 3 by the fact that, once it has been prevented due to a spin situation being detected, replenishing can resume if the pressure in the discharge duct (to which the replenishing valve is connected) reaches a value deemed to be a limit value, e.g. about 320 bars.

In FIG. 3, the replenishing valve 110 has two return springs 115A and 115B which continuously urge it back in its closure direction. It is caused to move in its opening direction in two manners.

Firstly, it operates as a pressure limiter by being controlled by the pressure at its inlet 110A (i.e. at the outlet of the replenishing selector 69) by means of a first control duct 110B.

Secondly, it is controlled by means of a second control duct 114 which connects the boost duct 58 to a control chamber 113.

The forces exerted on the moving portion of the valve by the springs 115A and 115B correspond to a rating for a threshold pressure $P_s$ corresponding to the force of the spring 115A alone, and to a rating for a limit pressure $P_1$ corresponding to the sum of the forces of the springs 115A and 115B.

More precisely, under normal operating conditions and when the pressure in the boost duct 58 (limited by the value of the rating of the boost pressure limiter, e.g. 25 bars) is greater than the threshold pressure $P_s$ (e.g. 20 bars), the effect of the spring 115B is neutralized and the valve 110 can thus open under the effect of the pressure in the duct 110A when the pressure in the duct 110A in communication with the main duct that is at the lower pressure is greater than the threshold pressure $P_s$ and thus overcomes the return force of the spring 115A. Replenishing can then take place.

When the pressure in the duct 114 (and thus in the boost duct 58) becomes less than the threshold pressure $P_s$, the force exerted by the spring 115A becomes preponderant over the pressure in the chamber 113 and the replenishing link is then prevented from being established.

At the same time, the spring 115B is no longer neutralized and the valve thus becomes rated to a pressure $P_1$ corresponding to the sum of the forces exerted by the springs 115A and 115B. However, if the pressure in the delivery duct, to which the inlet 100A of the valve 110 is connected via the replenishing valve 69, becomes greater than said rating value $P_1$, then the valve 100 opens due to the backpressure coming from the duct 110B. Replenishing can thus resume and the pressure in the main duct at the lower pressure is thus limited to a value that prevents the components from being damaged while also preventing the wheel from spinning.

For example, $P_s$ is substantially equal to 20 bars, while $P_1$ is about 320 bars.

For example, the valve 110 can be of the same type as the M1B125 valve sold by Sterling Hydraulics.

FIG. 4 shows an embodiment in which the replenishing valve 70 is a conventional valve analogous to the replenishing valve shown in FIG. 1, while the replenishing selector 169 is a special valve that is provided with means for preventing the replenishing link from being established whenever a wheel looses grip.

The replenishing selector 169 is caused to return to its neutral position, in which it isolates the two main ducts 50 and 54 from the replenishing valve when the pressure in the discharge main duct becomes greater than a limit value, thereby indicating that a spin situation is occurring.

As explained below, the control means for controlling the replenishing selector 169 comprise control chambers 173 and 174 suitable for being connected to respective ones of the main ducts 50 and 54 via a link duct 175 or 176 and, for each control chamber, a pressure reducer 171, 172 which, in an open position, is suitable for allowing a link to be established between a main duct and a control chamber via a link duct, and, in a closed position, is suitable for interrupting said link and for connecting said link duct to the replenishing valve 70, each reducer being suitable for going into its closed position when the pressure in the main duct that it connects to the control chamber becomes higher than said limit value.

More precisely, the selector has three conventional ports, namely an outlet port 169A connected to the inlet of the replenishing valve 70 and two inlet ports 169B and 169C connected to respective ones of the two main ducts 50 and 54. It also has two link ports 169D and 169E. The port 169D is connected to a first pressure reducer 171 which is interposed between said port 169D and the control chamber 173 which, when fed with fluid, urges the selector 169 towards a first position I. The port 169E is connected to a second pressure reducer 172 which is interposed between said port 169E and the control chamber 174 which, when fed with fluid, urges the selector 169 towards a second position II.

The pressure reducers 171, 172 are urged continuously towards their open positions, shown in FIG. 4, in which they connect the ports 169D and 169E to respective ones of the control chambers 173 and 174, and to the outlet 169A of the selector, via constrictions.

The springs, respectively 171' and 172', which urge them into these positions are rated for low pressures, e.g. about 20 bars.

The two reducers have the same rating pressure. The link duct 175 (or 176) that connects the port 169D (or 169E) to the control chamber 173 (or 174) is also connected to the outlet 169A of the selector via a link including a check valve 177 (or 178) which allows fluid to flow only from the outlet 169A to the control chamber 173 (or 174) and to the pressure reducer 171 (or 172) and a constriction 179 (or 180) disposed in parallel with the check valve.

In its open position, the pressure reducer 171 (or (172)) connects the link duct 175 (or 176) to the link port 169D (or 169E) of the selector 169.

In its closed position (not shown), said reducer 171 (or 172) connects the link duct 175 (or 176) to a return duct 181 (or 182) for returning to the outlet 169A of the selector, thereby closing the link between the main duct 50 (or 54) and the control chamber 173 (or 174). The pressure reducer 171 (or 172) is caused to go towards its closed position against the force exerted by the spring 171' (or 172') by the fluid pressure coming from the link duct 175 (or 176).

Operation is as follows:

In the normal operating situation, since the pressure in one of the two main ducts 50 and 54 is at the boost pressure, e.g. 30 bars, which is still less than the sum of the rating pressures of the spring 171' or 172' (e.g. 20 bars), and of the pressure limiter 70 (e.g. 25 bars), the corresponding pressure reducer 171 or 172 is open and the corresponding control chamber is put into communication with the corresponding main duct. Since the pressure in the other main duct 50 or 54 is the higher pressure that is greater than the sum of the rating pressures of the corresponding pressure reducer 171, or 172, and of the pressure limiter 70, the corresponding pressure reducer 172 or 171 closes, interrupting the link between the main duct in question and the corresponding control chamber, and puts said control chamber into communication with the outlet 169A of the selector while reducing the pressure in said chamber to the sum of the ratings of the pressure reducer and of the pressure limiter. Since said pressure is greater than the pressure prevailing in the other control chamber, the selector behaves like a conventional selector, by being moved towards its position I when the duct 50 is at the high pressure (feed) so as to connect the duct 54 that is at the low pressure (discharge) to its outlet 169A and vice versa for the position II. Replenishing is then performed normally by the valve 70.

It is considered, for example, that the selector 169 is in its position I, the ducts 50 and 54 serving respectively for feed and for discharge.

If the pressure in the discharge duct 54 increases to in excess of the above-specified pressure threshold (sum of the rating pressures of the reducer 172 and of the pressure limiter 70), said pressure causes said reducer to move in the closure direction, putting the link duct 176 and thus the control chamber 174 into communication with the return duct 182.

The pressure at the two terminals of the selector (i.e. in the chambers 173 and 174) is thus then at the same value because the rating pressures of the reducers are the same, so that the selector 169 reaches its neutral position N in which it prevents any replenishing link because it isolates the main ducts 50 and 54 from the inlet of the replenishing valve 70.

Thus, in the embodiment shown in FIG. 4, the condition that reveals a spin situation is an increase in pressure in the discharge duct to beyond a determined threshold, which causes the replenishing link to be closed. As indicated above, such an increase in pressure takes place when spin occurs, for a circuit of the same type as the circuits shown in FIGS. 1 to 4, because of the series link between a half-motor coupled to one of the displacement members and a motor coupled to another displacement member disposed in front of or behind the preceding displacement member. It also occurs when spin takes place, for a circuit of same type as the circuit of FIG. 5, described below, because of the respective links to the orifices of a second pump of a half-motor coupled to a displacement member and of a second motor coupled to another displacement member.

The restrictions 179 and 180 slow down the emptying of the control chambers 173 and 174, and thus slow down the movement of the selector from its central position N to its position I or to its position II.

Conversely, the check valves 177 and 178 not provided with constrictions enable the selector 169 to move rapidly from its position I or its position II to its central position N.

The circuit of FIG. 5 has two dual motors 210, 220, each of which has two half-motors, respectively 211 & 212 and 221 & 222 for driving the wheels 1, 2 (e.g. the front wheels) and a motor 230 for driving a wheel 3,(e.g. a rear wheel).

The first main connection 210A of the motor 210 is connected to a first main duct 250 which is itself connected to a first orifice 252A of the pump 252. The third main connection 210C of the motor 210 is connected to a second main duct 254 connected to another orifice 252B of the pump 252, while its second main connection 210B is connected to an additional main duct 254' which is connected to an orifice 252'B of an additional pump 252'.

The first main connection 220A of the second dual motor 220 is also connected to said orifice 252'B of the pump 252', via the additional main duct 254'.

The third main connection 220C of the motor 220 is connected to the other orifice 252'A of the pump 252' via the additional main duct 250', while its second main connection 220B is connected to the main duct 250.

The motor 230 has its first main orifice 230A connected to the main duct 254 and its second main orifice 230B connected to the additional main duct 250'.

Thus, the motor 230 is in parallel with the half-motor 212 because of the their connections 230A and 210C being linked to the main duct 254, but it is also in parallel with the half-motor 222 because of their connections 230B and 220C being linked to the first additional main duct 250'. Similarly, the half-motor 211 and the motor 220 are in parallel because of their connections 210B and 220A being linked to the second additional main duct 254', while the half-motor 221 and the motor 210 are in parallel because of their connections 220B and 210A being linked to the first main duct 250.

The circuit includes a replenishing selector 260 for the main ducts 250 and 254 connected to the pump 252, and a replenishing selector 269' for the main ducts 250' and 254' connected to the additional pump 252'.

The circuit thus includes two interleaved sub-circuits, each of which has a pump and a replenishing selector. The two pumps are interconnected mechanically so as to synchronize the motors, and a booster pump 256 is connected conventionally to the two sub-circuits.

Upstream from its replenishing selector 269, or 269', each sub-circuit has a replenishing valve 270 or 270' which includes a flow-rate regulator by means of its constriction 270A or 270'A. As in the embodiment shown in FIG. 1, a replenish enable/disable valve 272 or 272' is disposed downstream from the replenishing valve 270 or 270', and said enable/disable valve is a two-position selector, controlled by a control duct 274, connected to the boost duct 258 of the two sub-circuits.

For each sub-circuit, the replenish enable/disable valve is analogous to the enable/disable valve of FIG. 1, and it operates in the same way.

Naturally, the variants shown in FIGS. 2 to 4 are usable for the circuit of FIG. 5, by being applied to each of the two sub-circuits.

The invention claimed is:

1. A hydrostatic transmission circuit for a vehicle having at least one first displacement member and at least one second displacement member disposed one after the other in the direction of travel of said vehicle, the circuit comprising at least one main hydraulic pump, two main ducts which are respectively a feed main duct and a discharge main duct, and a first hydraulic motor and a second hydraulic motor for driving respective ones of said first and of said second displacement members, at least the first hydraulic motor being a dual motor made up of two elementary motors, each elementary motor having a feed or discharge first elementary connection and a discharge or feed second elementary connection, the first elementary connections being united to form a common first main connection for the first hydraulic motor, while the second elementary connections are mutually separate and form respective ones of the second and third main connections of the first hydraulic motor, the first main connection of the first hydraulic motor being connected to the first main duct while the second main connection of said first motor is connected to a first feed or discharge additional duct; and the third main connection of said first motor is connected to the second main duct, the second hydraulic motor having a first main connection which is connected to the second main duct and a second main connection which is connected to a second feed or discharge additional duct the circuit further comprising booster means for boosting the feed or discharge ducts and at least one replenishing valve suitable for being connected to one of the main ducts and suitable for taking up an open configuration in which it enables a replenishing link to be established between the main duct to which it is connected and a pressure-free reservoir, and a closed configuration in which it prevents said link from being established, said circuit further comprising means for preventing the replenishing link from being established on detecting a condition that reveals a spin situation.

2. A circuit according to claim 1, wherein the means for preventing the replenishing means from being established comprises a replenish enable/disable valve caused to go between an open position in which said enable/disable valve opens the replenishing link and a closed position in which said enable/disable valve closes said link, the replenish enable/disable valve being caused to move between said open and closed positions as a function of a parameter expressing said condition that reveals a spin situation.

3. A circuit according to claim 2, wherein the replenish enable/disable valve is a solenoid valve, receiving a closure control signal when the condition that reveals a spin situation is detected.

4. A circuit according to claim 1, wherein the condition that reveals a spin situation is the fact that the pressure in the boost duct is lower than a determined threshold pressure.

5. A circuit according to claim 2, wherein the condition that reveals a spin situation is the fact that the pressure in the boost duct is lower than a determined threshold pressure.

6. A circuit according to claim 2, wherein the replenish enable/disable valve is driven by a pressure in the boost duct against a return force to go between a replenish enable position in which said enable/disable valve enables the replenishing link to be established, and a replenish disable position in which said enable/disable valve prevents said link from being established.

7. A circuit according to claim 2, wherein the replenish enable/disable valve is disposed between the replenishing valve and the reservoir.

8. A circuit according to claim 1, wherein the replenishing valve has a moving member mounted to move between a first position and second position, which positions correspond respectively to the open configuration and to the closed configuration of the replenishing valve, said replenishing valve having an opening control chamber suitable for being connected to one of the main ducts for urging the moving member towards the first position thereof and a closure control chamber suitable for being fed with fluid so as to urge the moving member towards the second position thereof, said circuit further comprising a control valve suitable, as a function of the pressure in the boost duct, for connecting said closure control chamber to the pressure-free reservoir or for isolating said chamber from said reservoir.

9. A circuit according to claim 2, wherein the replenishing valve has a moving member mounted to move between a first position and second position, which positions correspond respectively to the open configuration and to the closed configuration of the replenishing valve, said replenishing valve having an opening control chamber suitable for being connected to one of the main ducts for urging the moving member towards the first position thereof and a closure control chamber suitable for being fed with fluid so as to urge the moving member towards the second position thereof, said circuit further comprising a control valve suitable, as a function of the pressure in the boost duct, for connecting said closure control chamber to the pressure-free reservoir or for isolating said chamber from said reservoir.

10. A circuit according to claim 6, wherein the replenishing valve has a moving member mounted to move between a first position and second position, which positions correspond respectively to the open configuration and to the closed configuration of the replenishing valve, said replenishing valve having an opening control chamber suitable for being connected to one of the main ducts for urging the moving member towards the first position thereof and a closure control chamber suitable for being fed with fluid so as to urge the moving member towards the second position thereof, said circuit further comprising a control valve suitable, as a function of the pressure in the boost duct, for connecting said closure control chamber to the pressure-free reservoir or for isolating said chamber from said reservoir and wherein the replenish enable/disable valve is the control valve.

11. A circuit according to claim 8, wherein the closure control chamber is suitable for being fed with fluid by being connected to one of the main ducts.

12. A circuit according to claim 11, wherein the opening and closure control chambers are suitable for being connected to the same main duct, a constriction being disposed between said main duct and the closure control chamber.

13. A circuit according to claim 8, wherein the closure control chamber is associated with replenishing resilient return means urging said moving member continuously towards its second position.

14. A circuit according to claim 1, wherein the first and second feed or discharge additional duct form together an interconnection duct between the second main connection of the first motor and the second main connection of the second motor.

15. A circuit according to claim 2, wherein the first and second feed or discharge additional duct form together an interconnection duct between the second main connection of the first motor and the second main connection of the second motor.

16. A circuit according to claim 1, wherein the first feed or discharge additional duct connects the second connection of the first motor to a first orifice of an additional main hydraulic pump, and the second feed or discharge additional duct connects the second connection of the second motor to a second orifice of said additional main hydraulic pump.

17. A circuit according to claim 2, wherein the first feed or discharge additional duct connects the second connection of the first motor to a first orifice of an additional main hydraulic pump, and the second feed or discharge additional duct connects the second connection of the second motor to a second orifice of said additional main hydraulic pump.

18. A circuit according to claim 14, further comprising means for enabling the replenishing link to be established again when the pressure in the discharge main duct becomes higher than a determined limit pressure.

19. A circuit according to claim 16, further comprising means for enabling the replenishing link to be established again when the pressure in the discharge main duct becomes higher than a determined limit pressure.

20. A circuit according to claim 1, further comprising a replenishing selector suitable for putting the main duct that is at the lower pressure into communication with the replenishing valve.

21. A circuit according to claim 2, further comprising a replenishing selector suitable for putting the main duct that is at the lower pressure into communication with the replenishing valve.

22. A circuit according to claim 20, wherein the replenishing selector is caused to return to a neutral position thereof, in which said selector isolates the two main ducts from the replenishing valve when a pressure in the discharge main duct becomes higher than a limit valve.

23. A circuit according to claim 22, wherein the replenishing selector is controlled via control chambers suitable for being connected to respective ones of the main ducts via a respective link duct and, for each control chamber, a pressure reducer which, in an open position, is suitable for enabling a link to be established between a main duct and a control chamber via a link duct and, in a closed position, is suitable for interrupting said link and for connecting said link duct to the replenishing valve, each reducer being suitable for going into a closed position thereof when a pressure in the main duct that said reducer connects to the control chamber becomes higher than said limit valve.

24. A circuit according to claim 1, wherein the replenishing valve comprises a pressure limiter suitable for being opened by the pressure in the main duct to which its inlet is connected.

25. A circuit according to claim 2, wherein the replenishing valve comprises a pressure limiter suitable for being opened by the pressure in the main duct to which its inlet is connected.

26. A circuit according to claim 24, wherein the replenishing valve comprises a flow-rate regulation device.

27. A circuit according to claim 25, wherein the replenishing valve comprises a flow-rate regulation device.

* * * * *